(12) United States Patent
Sugamata (10) Patent No.: US 10,935,821 B2
(45) Date of Patent: Mar. 2, 2021

(54) OPTICAL MODULATOR

(71) Applicant: SUMITOMO OSAKA CEMENT CO., LTD., Tokyo (JP)

(72) Inventor: Toru Sugamata, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 18 days.

(21) Appl. No.: 16/088,066

(22) PCT Filed: Apr. 3, 2017

(86) PCT No.: PCT/JP2017/013873
§ 371 (c)(1),
(2) Date: Sep. 24, 2018

(87) PCT Pub. No.: WO2017/171093
PCT Pub. Date: Oct. 5, 2017

(65) Prior Publication Data
US 2019/0324301 A1    Oct. 24, 2019

(30) Foreign Application Priority Data

Apr. 1, 2016  (JP) .............................. JP2016-073793

(51) Int. Cl.
*G02F 1/03*   (2006.01)
*G02F 1/035*  (2006.01)

(52) U.S. Cl.
CPC ...... *G02F 1/0356* (2013.01); *G02F 2202/102* (2013.01); *G02F 2202/103* (2013.01); *G02F 2202/20* (2013.01); *G02F 2203/21* (2013.01)

(58) Field of Classification Search
CPC ............. G02F 1/0356; G02F 2202/102; G02F 2202/103; G02F 2202/20; G02F 2203/21
See application file for complete search history.

(56) References Cited

U.S. PATENT DOCUMENTS 3,629,781 A * 12/1971 Helgeland .............. H01C 1/034
                                                    338/276
3,678,417 A *  7/1972 Ragan .................... H01P 1/268
                                                    333/22 R (Continued)

FOREIGN PATENT DOCUMENTS

JP   H02289821   11/1990
JP   H04125903    4/1992

(Continued)

OTHER PUBLICATIONS

Shibuya et al., Embedded TiNxOy Thin-Film Resistors in a Build-Up CSP for 10 Gbps Optical Transmitter and Receiver Modules, IEEE Transactions on Advanced Packaging, vol. 25, No. 3, Aug. 2002 (Year: 2002).*

(Continued)

*Primary Examiner* — Peter Radkowski
(74) *Attorney, Agent, or Firm* — JCIPRNET (57) ABSTRACT

Provided is an optical modulator capable of effectively dispersing and releasing heat generated by termination resistors, improving the reliability of a termination substrate including the termination resistors, and reducing influence of heat on an optical waveguide. In an optical modulator including an optical waveguide substrate on which an optical waveguide is formed, a signal electrode is provided on the optical waveguide substrate for applying an electric field, a termination resistor terminating the signal electrode, and a termination substrate on which the termination resistor is disposed, at least a plurality of the termination resistors are provided for a single termination substrate, and for preventing heat generated by the termination resistor from being concentrated on a local portion in the termination substrate or conducted to the optical waveguide substrate, a ground electrode provided on the termination substrate and (Continued)

electrically connected to the termination resistor is formed to be thicker than 0.1 μm.

19 Claims, 8 Drawing Sheets

(56) References Cited

U.S. PATENT DOCUMENTS

| | | | | |
|---|---|---|---|---|
| 4,199,745 | A * | 4/1980 | Barry | H01C 1/01 338/308 |
| 4,486,738 | A * | 12/1984 | Sadlo | H01C 17/006 219/543 |
| 5,129,017 | A * | 7/1992 | Kawano | G02F 1/0356 385/2 |
| 5,220,627 | A * | 6/1993 | Kawano | G02F 1/0356 385/2 |
| 5,661,450 | A * | 8/1997 | Davidson | H01C 1/14 29/620 |
| 6,044,097 | A * | 3/2000 | Kawamura | H01S 5/0265 372/38.01 |
| 6,124,768 | A * | 9/2000 | Makiyama | H01P 1/266 333/127 |
| 6,593,829 | B2 * | 7/2003 | Oldfield | H01P 1/268 333/22 R |
| 6,661,315 | B2 * | 12/2003 | Iio | H01P 1/2016 333/134 |
| 6,909,343 | B2 * | 6/2005 | Iio | H01P 1/2016 333/134 |
| 7,349,224 | B2 * | 3/2008 | Ohsaka | H01L 23/66 257/E23.067 |
| 7,668,417 | B2 * | 2/2010 | Jiang | H04B 10/505 385/1 |
| 7,692,445 | B2 * | 4/2010 | Muraoka | H03K 19/018521 326/27 |
| 7,705,953 | B2 * | 4/2010 | Sato | G09G 3/3611 345/204 |
| 7,755,959 | B2 * | 7/2010 | Kwean | G11C 29/1201 365/189.11 |
| 7,821,354 | B2 * | 10/2010 | Niiranen | H01P 5/187 333/116 |
| 7,934,109 | B2 * | 4/2011 | Macri | G06F 1/3203 713/300 |
| 7,969,197 | B2 * | 6/2011 | Muraoka | H03K 19/018521 326/30 |
| 8,222,917 | B2 * | 7/2012 | Oliva | H04L 25/0278 257/298 |
| 8,324,925 | B2 * | 12/2012 | Muraoka | H03K 19/018521 326/27 |
| 8,559,768 | B2 * | 10/2013 | Shimizu | G02F 1/0327 385/12 |
| 8,774,564 | B2 * | 7/2014 | Shimizu | G02F 1/0121 359/237 |
| 9,696,603 | B2 * | 7/2017 | Wurtz | G02F 1/21 |
| 2002/0021186 | A1 * | 2/2002 | Iio | H01P 7/08 333/134 |
| 2003/0048146 | A1 * | 3/2003 | Oldfield | H01P 1/268 333/22 R |
| 2004/0036543 | A1 * | 2/2004 | Iio | H01P 1/2135 331/107 DP |
| 2005/0230823 | A1 * | 10/2005 | Ohsaka | H01L 23/66 257/735 |
| 2007/0188187 | A1 * | 8/2007 | Oliva | H04L 25/0278 326/30 |
| 2007/0288781 | A1 * | 12/2007 | Macri | G06F 1/3203 713/322 |
| 2008/0095542 | A1 * | 4/2008 | Jiang | H04B 10/505 398/198 |
| 2008/0265944 | A1 * | 10/2008 | Muraoka | H03K 19/018521 326/86 |
| 2008/0298736 | A1 * | 12/2008 | Koenig | G02F 1/065 385/2 |
| 2008/0298737 | A1 * | 12/2008 | Yu | B29D 11/00663 385/2 |
| 2008/0304345 | A1 * | 12/2008 | Kwean | G11C 29/1201 365/201 |
| 2008/0316382 | A1 * | 12/2008 | Sato | G09G 3/3611 349/33 |
| 2009/0146758 | A1 * | 6/2009 | Niiranen | H01P 5/185 333/116 |
| 2010/0219856 | A1 * | 9/2010 | Muraoka | H03K 19/018521 326/27 |
| 2011/0013863 | A1 * | 1/2011 | Shimizu | G02F 1/0121 385/2 |
| 2011/0103030 | A1 * | 5/2011 | Cases | H01L 23/647 361/782 |
| 2011/0215830 | A1 * | 9/2011 | Muraoka | H03K 19/018521 326/30 |
| 2012/0087614 | A1 * | 4/2012 | Ishimura | G02F 1/2255 385/2 |
| 2015/0063809 | A1 * | 3/2015 | Sugiyama | H04J 14/06 398/65 |
| 2016/0064366 | A1 * | 3/2016 | Tsukada | H01L 25/18 257/773 |

FOREIGN PATENT DOCUMENTS

| | | |
|---|---|---|
| JP | H0774420 | 3/1995 |
| JP | 2002277840 | 9/2002 |
| JP | 2005234267 | 9/2005 |
| JP | 2009008978 | 1/2009 |
| JP | 2012078759 | 4/2012 |
| JP | 2014199302 | 10/2014 |
| JP | 2015069162 | 4/2015 |

OTHER PUBLICATIONS

"International Search Report (Form PCT/ISA/210)"of PCT/JP2017/013873, dated Jul. 4, 2017, with English translation thereof, pp. 1-4.

"Notification of Reasons for Refusal of Japan Counterpart Application," dated Jun. 27, 2017, with English translation thereof, p. 1-p. 7.

"Notification of Reasons for Refusal of Japan Counterpart Application," dated Jan. 9, 2018, with English translation thereof, p. 1-p. 4.

* cited by examiner

OPTICAL MODULATOR

CROSS-REFERENCE TO RELATED APPLICATION

This application is a 371 application of International PCT application serial no. PCT/JP2017/013873, filed on Apr. 3, 2017, which claims the priority benefit of Japan application no. 2016-073793, filed on Apr. 1, 2016. The entirety of each of the abovementioned patent applications is hereby incorporated by reference herein and made a part of this specification.

TECHNICAL FIELD

The present invention relates to an optical modulator and particularly to an optical modulator including a termination substrate.

BACKGROUND ART

In recent years, in high-frequency/high-capacity optical fiber communication systems, optical modulators using substrates having optical waveguides formed therein and optical transmission apparatus embedded with the optical modulators are frequently used. Among these, optical modulators in which $LiNbO_3$ (hereinafter, also referred to as LN) having an electro-optic effect is used for substrates are widely used for high-frequency/high-capacity optical fiber communication systems, as compared with modulators of semiconductor-based materials such as InP, Si, and GaAs. In the optical modulator using LN, a Mach-Zehnder type optical waveguide formed by an optical waveguide for confining light in the LN substrate and guiding the light and an electrode for applying an electric field are formed in a modulation unit. In addition, the electrode is configured with a signal-electrode unit for applying a high-frequency signal (also referred to as "modulation signal") for modulating light based on a data signal input from the outside of the optical modulator, and a DC electrode unit for applying a dither signal and a DC voltage to perform control corresponding to a change in an operating point due to DC drift, temperature drift or the like.

Regarding modulation forms of optical modulators for high-frequency/high-capacity optical fiber communication systems, in response to the recent trend of an increase in transmission capacity, from intensity modulation (On-Off keying) in the related art, a transmission format of multilevel modulation or a transmission format incorporating polarization multiplexing in multilevel modulation, such as Quadrature Phase Shift Keying (QPSK) using phase modulation or Dual Polarization-Quadrature Phase Shift Keying (DP-QPSK), have become mainstream.

Figure 1:
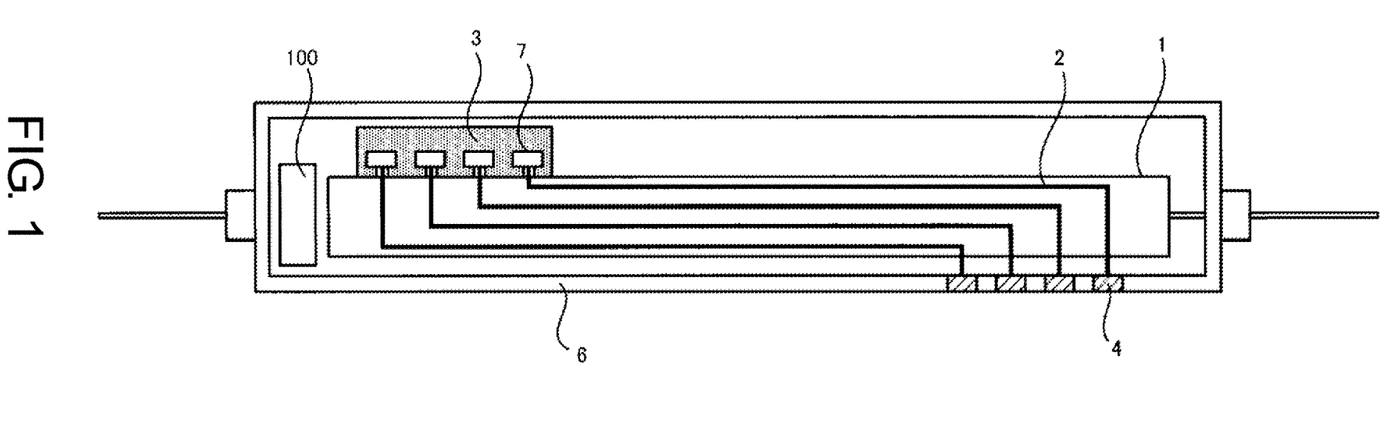
FIG. 1 is a plan view showing an example of a DP-QPSK optical modulator.

An optical modulator for realizing DP-QPSK modulation (also referred to as a DP-QPSK optical modulator) has, as shown in FIG. 1, an optical waveguide (not shown) structure in which two nested optical waveguides each including two Mach-Zehnder type optical waveguides are disposed on a substrate of LN (optical waveguide substrate) 1 or the like (an optical waveguide device having this structure is referred to as "DP-QPSK chip"). In addition, a plurality of signal electrodes 2 are provided on the optical waveguide substrate 1 in order to apply a modulation signal to the modulation unit constituting each Mach-Zehnder type optical waveguide. A data signal is input to each signal electrode 2 through the input connector 4. In addition, a termination resistor 7 is connected to the termination end of each signal electrode 2. A substrate of LN (optical waveguide substrate) 1 and a termination substrate 3 on which the termination resistors are disposed are disposed in a housing 6 and packaged.

In the case where the termination resistor is provided at the termination end of each signal electrode, as shown in FIG. 1, a plurality of termination resistors 7 may be provided within the same termination substrate 3 and the miniaturization of the packaged DP-QPSK optical modulator may be intended in some cases.

Figure 3A:
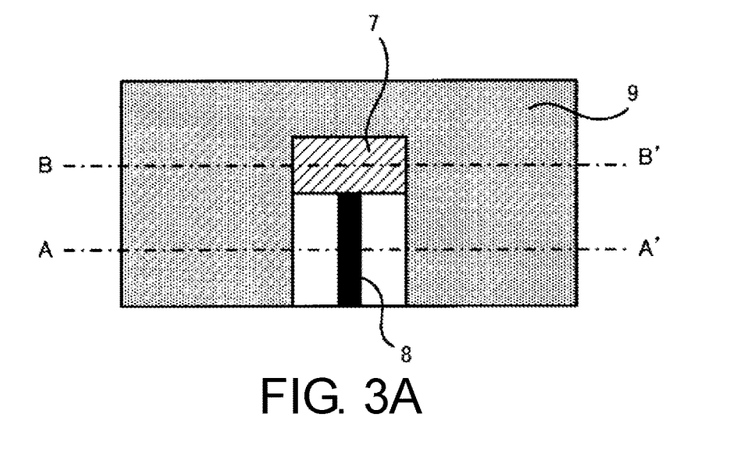
FIG. 3A is a plan view showing an example of a termination substrate of the related art.

The frequency of the modulation signal applied to the signal electrode of the DP-QPSK optical modulator is a high-frequency signal of a microwave band, and a traveling wave type electrode structure is used for the signal electrode. Almost all the electric energy of the modulation signal is consumed by the termination resistor and converted into heat by the termination resistor (resistive film) in the termination substrate 3. There is a problem that the characteristics of the termination resistor deteriorate due to the generated heat, and the reliability of the DP-QPSK optical modulator is impaired.

The DP-QPSK optical modulator has four modulation units. In order to perform QPSK modulation in this configuration, it needs to be driven with voltage amplitude (power is 4 times) twice the voltage amplitude in the case of performing intensity modulation in the related art by using an optical modulator having a single Mach-Zehnder type optical waveguide (referred to as "single modulator"). Therefore, the power consumed by the DP-QPSK optical modulator is 16 times or more as compared with a single modulator in the related art, so that the calorific value also becomes 16 times or more. Moreover, in a case of miniaturizing the optical modulator, it is necessary to dispose the termination substrate 3 close to the optical waveguide substrate 1. Heat generated at the termination resistor affects the optical waveguide device and causes temperature drift. Further, the heat generation of the termination resistor causes deterioration with time of the termination resistor itself, cracking/peeling, and the like, which causes problems such as impairing in the reliability of an optical modulator and an optical transmission apparatus using the optical modulator.

Figure 2:
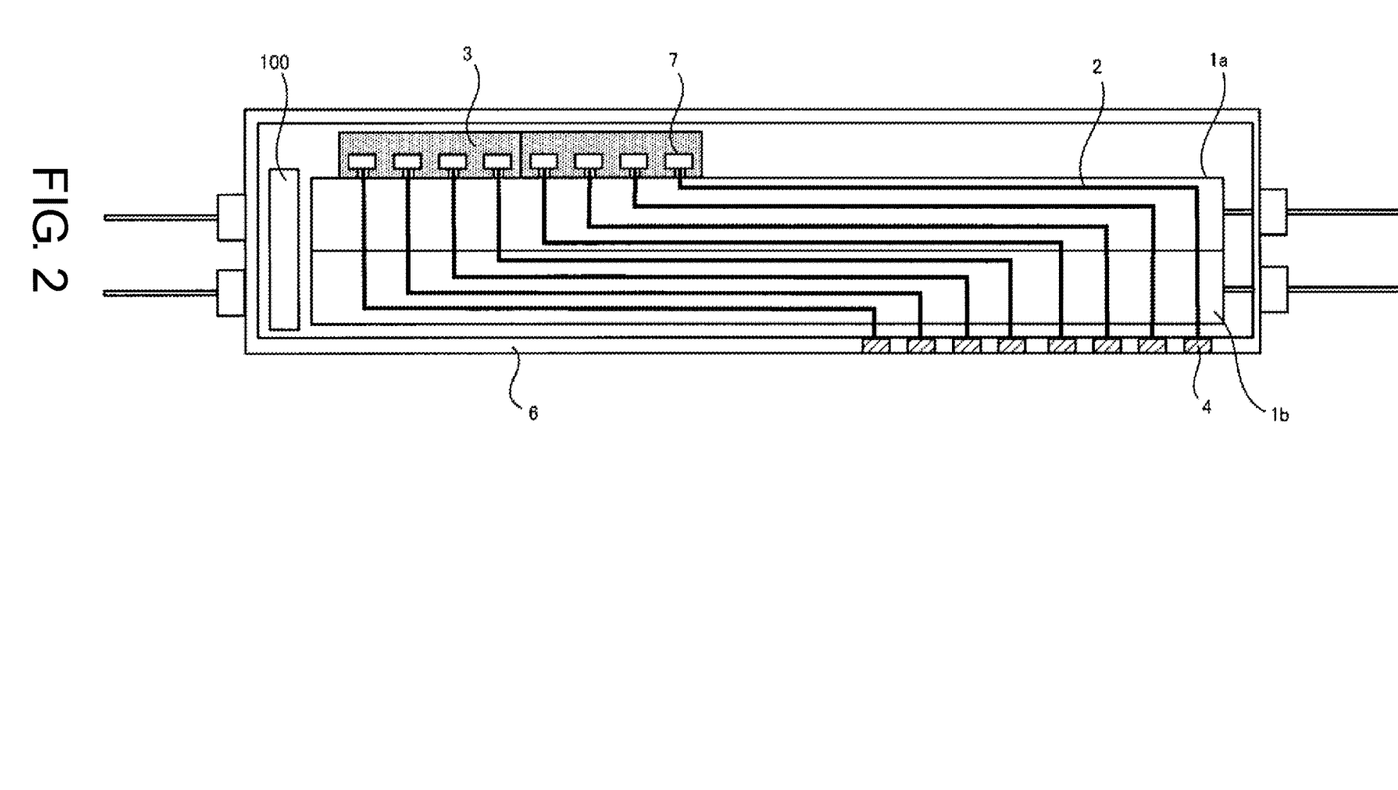
FIG. 2 is a plan view showing an example in which two DP-QPSK optical modulators are mounted.

Furthermore, it has also been proposed to further increase the transmission capacity by performing QPSK modulation by using a plurality of DP-QPSK chips (multi-element configuration) (see, for example, Patent Literature No. 1). As shown in FIG. 2, in a case where two DP-QPSK chips are disposed in a single housing and packaged, the calorific value in the housing is 32 times higher as compared with the case where intensity modulation of a single modulator structure is performed, which is a serious problem. In FIG. 2, the optical waveguide substrates 1a and 1b are disposed side by side. However, as in Patent Literature No. 1, a plurality of optical waveguide substrates may be stacked and disposed in some cases.

In the related art, the heat generation of the termination resistor in a single modulator has been handled without being separated from the operating point change due to the DC drift immediately after the start of the operation of the optical modulator.

However, in a case where (a) the amplitude of the modulation signal is large, (b) there are a plurality of termination resistors, (c) the termination resistors are integrated on one termination substrate, such as an optical modulator in which is a plurality of DP-QPSK chips are used (multi-element configuration) and QPSK modulation is performed, the influence of heat generation of the termination resistor becomes large, and the problem has become serious.

In addition, by (d) miniaturizing the optical modulators and (e) making them as a plural-element configuration (multi-element configuration), the effects thereof become more severe.

As a measure for reducing the problem of heat generation by such a termination resistor, as disclosed in Patent Literature No. 2, it has been proposed to increase the area of the termination resistor or to provide a hole for heat conduction on a support constituting the termination substrate. However, with these configurations and methods, the termination substrate itself becomes large and the manufacturing cost also increases, so it becomes difficult to realize a small-sized optical modulator at low cost. Therefore, in order to respond to the demand for miniaturization and low cost, a highly reliable optical modulator is required in which a change in an operating point is suppressed, by a measure against heat generation which is not present in a configuration and a method of the related art.

CITATION LIST

Patent Literature

[Patent Literature No. 1] Japanese Laid-open Patent Publication No. 2015-69162
[Patent Literature No. 2] Japanese Laid-open Patent Publication No. 2014-199302

SUMMARY OF INVENTION

Technical Problem

A problem to be solved by the present invention is to provide an optical modulator in which the influence of heat generated by a termination resistor is suppressed, as described above. In particular, it is to suppress the heat generation of the termination resistor, which becomes more prominent, in an optical modulator having a plurality of signal inputs and a plurality of termination resistors, such as a DP-QPSK optical modulator. Another object of the present invention is to provide an optical modulator capable of enhancing the reliability of a termination substrate including a termination resistor and suppressing the temperature drift of the optical modulator by applying an effective measure against heat dissipation.

Solution to Problem

In order to solve the above problem, an optical modulator of the present invention has the following technical features.

(1) An aspect of the present invention is an optical modulator including an optical waveguide substrate on which an optical waveguide is formed, a signal electrode provided on the optical waveguide substrate for applying an electric field to the optical waveguide, a termination resistor terminating the signal electrode, and a termination substrate on which the termination resistor is disposed, at least a plurality of the termination resistors are provided for a single termination substrate, and for preventing heat generated by the termination resistor from being concentrated on a local portion in the termination substrate or conducted to the optical waveguide substrate, a ground electrode provided on the termination substrate and electrically connected to the termination resistor is formed to be thicker than 0.1 µm.

(2) In the optical modulator according to the above (1), a thickness of the ground electrode is set in a range of 0.1 µm to 20 µm.

(3) Another aspect of the present invention is an optical modulator including an optical waveguide substrate on which an optical waveguide is formed, a signal electrode provided on the optical waveguide substrate for applying an electric field to the optical waveguide, a termination resistor terminating the signal electrode, and a termination substrate on which the termination resistor is disposed, at least a plurality of the termination resistors are provided for a single termination substrate, and for preventing heat generated by the termination resistor from being concentrated on a local portion in the termination substrate or conducted to the optical waveguide substrate, with respect to a ground electrode provided on the termination substrate and electrically connected to the termination resistor, a position of an end of the ground electrode on the optical waveguide substrate side in the vicinity of the termination resistor is disposed to be retracted from an end of the termination substrate on the optical waveguide substrate side toward the inside of the termination substrate.

(4) In the optical modulator according to the above (3), the position of an end of the ground electrode on the optical waveguide substrate side is disposed to be retracted from the end of the termination substrate on the optical waveguide substrate side toward the inside of the termination substrate in a range of 10 µm to 300 µm.

(5) Still another aspect of the present invention is an optical modulator including an optical waveguide substrate on which an optical waveguide is formed, a signal electrode provided on the optical waveguide substrate for applying an electric field to the optical waveguide, a termination resistor terminating the signal electrode, and a termination substrate on which the termination resistor is disposed, at least a plurality of the termination resistors are provided for a single termination substrate, and for preventing heat generated by the termination resistor from being concentrated on a local portion in the termination substrate or conducted to the optical waveguide substrate, mounting means for mounting the termination substrate in a housing has a heat conductive member connecting the termination substrate and the housing.

(6) In the optical modulator according to the above (5), the heat conductive member is a metal ribbon, a metal thin plate, or a metal wire.

(7) Further still another aspect of the present invention is an optical modulator including an optical waveguide substrate on which an optical waveguide is formed, a signal electrode provided on the optical waveguide substrate for applying an electric field to the optical waveguide, a termination resistor terminating the signal electrode, and a termination substrate on which the termination resistor is disposed, at least a plurality of the termination resistors are provided for a single termination substrate, and for preventing heat generated by the termination resistor from being concentrated on a local portion in the termination substrate or conducted to the optical waveguide substrate, disposition of the termination resistors is set such that for an interval a between the termination resistors, a distance b between a termination resistor R1 located at the extreme end and a lateral surface of the termination substrate close to the termination resistor R1 is larger than the interval a, or a distance c between the termination resistor and a rear surface of the termination substrate is larger than the interval a.

(8) Further still another aspect of the present invention is an optical modulator including an optical waveguide substrate on which an optical waveguide is formed, a signal electrode provided on the optical waveguide substrate for applying an electric field to the optical waveguide, a termination resistor terminating the signal electrode, and a termination substrate on which the termination resistor is disposed, at least a plurality of the termination resistors are provided for a single termination substrate, and for preventing heat generated by the termination resistor from being concentrated on a local portion in the termination substrate or conducted to the optical waveguide substrate, disposition of the termination resistor is set such that a distance d between adjacent termination resistors is larger than the interval e between the termination resistors in a direction along a front surface of the termination substrate facing the optical waveguide substrate.

(9) In the optical modulator according to the any one of the above (1) to (8), a resistance value of the termination resistor is smaller than 50Ω.

(10) In the optical modulator according to the any one of the above (1) to (9), the optical waveguide substrate is made of $LiNbO_3$, InP or Si.

Advantageous Effects of Invention

According to the present invention, it is possible to efficiently disperse and release heat generated by termination resistors, and improve the reliability of the termination resistors. It is possible to provide a highly reliable optical modulator capable of reducing influence of heat on an optical waveguide, in which temperature drift is suppressed.

DESCRIPTION OF EMBODIMENTS

Hereinafter, an optical modulator according to an aspect of the present invention will be described in detail.

As shown in FIG. 1 or 2, the optical modulator to which the present invention is applied is an optical modulator including an optical waveguide substrate 1 (1a, 1b) on which an optical waveguide is formed, a signal electrode 2 provided on the optical waveguide substrate for applying an electric field to the optical waveguide, a termination resistor 7 terminating the signal electrode, and a termination substrate 3 on which the termination resistor is disposed, and in particular, is an optical modulator including at least a plurality of the termination resistors for a single termination substrate 3. The optical modulator is provided with means for preventing heat generated by the termination resistor from being concentrated on a local portion in the termination substrate or conducted to the optical waveguide substrate.

As shown in FIG. 1 or 2, the optical waveguide substrate 1 and the termination substrate 3 are accommodated in a metallic housing 6 to constitute an optical modulator module. A dielectric such as $LiNbO_3$ or $LiTaO_3$, or a semiconductor such as InP and Si are used for the optical waveguide substrate 1. Even in the optical modulator of the present invention, the material of the optical waveguide substrate is not particularly limited, but a known dielectric or semiconductor substrate in the related art can be used. In forming the optical waveguide, a known technique such as a method of thermally diffusing Ti on the dielectric substrate of $LiNbO_3$ to form an optical waveguide, or a known technique for a ridge optical waveguide or the like can be used.

For the configuration of the optical waveguide, various optical waveguide shapes can be used, such as one Mach-Zehnder type optical waveguide, a so-called nested optical waveguide with nested two Mach-Zehnder type optical waveguides, and a waveguide in which two nested optical waveguide each having two Mach-Zehnder type optical waveguides are disposed, such as the DP-QPSK chip disclosed in Patent Document 1, or the like.

In addition, as shown in FIG. 1, the number of signal electrodes to which an input electrical signal is applied to the modulation unit of the optical waveguide is not limited to the DP-QPSK chip having four signal electrodes, and the present invention can be applied to various modulators such as a single type (with one modulation signal electrode) modulator, a dual type (with two modulation signal electrodes) modulator, and a DQPSK constituting modulator (with two modulation signal electrodes). In particular, since the number of termination resistors increases as the number of signal electrodes is increased, the present invention can be more effectively applied. For example, as shown in FIG. 2, the invention is particularly effective for a multi-element configuration incorporating two DP-QPSK chips and having eight input electrical signals.

The number of elements of the termination resistor formed on the termination substrate 3 is appropriately selected according to the configuration of the optical modulator, the electrode design, and the housing design. In the termination substrate 3 of the DP-QPSK optical modulator in FIG. 1, an example is illustrated in which four termination resistors are formed on the same substrate (support), but it is also possible to configure a plurality of termination substrates by dividing the termination substrate into a plurality of ones. Furthermore, the four termination resistors in FIG. 1 may be used to form terminal electrical circuits having two termination resistors or one termination resistor on the same substrate. In recent years, in order to miniaturize the size of the optical modulator, a plurality of termination resistors are often formed on the same substrate in many cases. As shown in FIG. 1 or 2, the present invention can be effectively applied in a case of using two or more termination resistors, particularly, in a case of disposing a plurality of termination resistors in the same termination substrate.

Figure 3B:
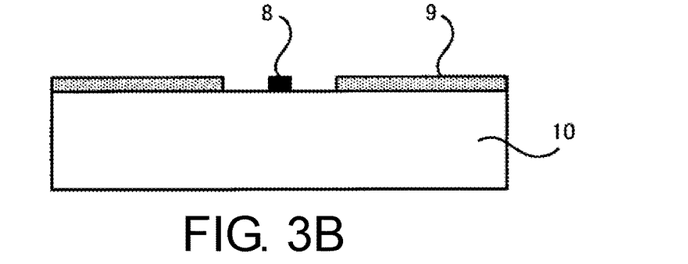
FIG. 3B is a cross-sectional view taken along one-dot chain line A-A' in FIG. 3A.
Figure 3C:
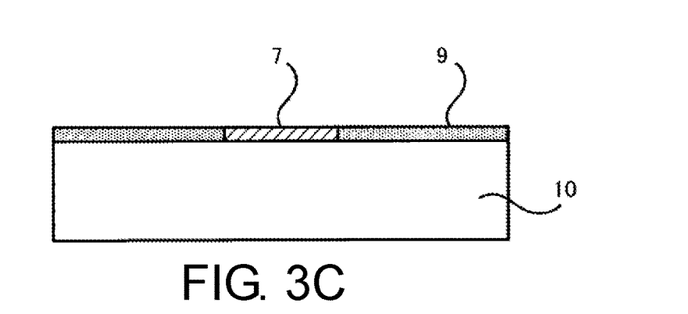
FIG. 3C is a cross-sectional view taken along one-dot chain line B-B' in FIG. 3A.

FIG. 3A to FIG. 3C are diagrams showing a termination substrate used in an optical modulator of the related art. FIG. 3A is a plan view of the termination substrate, FIG. 3B and FIG. 3C are cross-sectional views taken along one-dot chain line A-A' in FIG. 3A and one-dot chain line B-B' in FIG. 3A, respectively.

In the basic structure of the termination substrate, a termination resistor 7, a ground electrode 9, and a signal electrode 8 are provided on a ceramic substrate 10 of alumina or the like. Each electrode and termination resistor are formed of a thin film using vacuum deposition or sputtering in view of the requirement of high-frequency characteristics or productivity. For example, gold for the signal electrode 8 and the ground electrode 9 and nichrome for the termination resistor 7 are used.

These thin films are formed with a thickness of approximately 0.05 µm to 0.1 µm by a manufacturing method such as vacuum deposition or sputtering and from the viewpoint of required characteristics or cost.

The termination substrate thus formed is provided such that it is connected to the signal electrode output side of the optical waveguide substrate and the input high-frequency electrical signal is efficiently terminated by the termination resistor. The term "efficient termination" as used herein means that there is little reflection of the input high-frequency electrical signal at the termination portion and most of the input electrical signal energy is consumed at the termination end. Accordingly, the resistance value of the termination resistor is formed so as to match the thin-film resistance value of nichrome or the like so as to be 50Ω, according to the impedance 50Ω which is the impedance of the high-frequency signal generating source to be driven. That is, the termination resistor of the related art is aimed to be designed and provided such that the electric energy of the input high-frequency signal is consumed by the termination resistor as much as possible.

Although not shown in FIG. 3A to FIG. 3C, in addition to resistors to be termination resistors, other electronic components such as capacitors may be formed or mounted on the termination substrate in some cases, and components are selected as appropriate depending on the configuration of the applied optical modulator and the like.

In the optical modulator of the present invention, in a case where a plurality of termination resistors are present on the same termination substrate, the heat generated by the termination resistor is likely to concentrate on a local portion in the termination substrate, and the termination substrate is heated and heat is conducted to the optical waveguide substrate, which causes temperature drift. In order to prevent such a problem, in an aspect of the present invention, by using the following means, it is possible to prevent heat generated by the termination resistor from being concentrated on a local portion in the termination substrate or conducted to the optical waveguide substrate.

(1) By thickening the ground electrode in the vicinity of the termination resistor, the heat localized in the termination resistor and the local portion of the termination substrate is efficiently dispersed.

(2) By keeping the termination resistor and the ground electrode in the vicinity thereof, in which the temperature rises due to heat generation, far away from the optical waveguide substrate, the thermal influence on the optical waveguide substrate is reduced.

(3) In order to efficiently emit the heat generated by the termination resistor to the housing side, the ground electrode in the termination substrate and the housing are connected to each other by a heat conductive member such as a metal ribbon, a metal thin plate, or a metal wire.

(4) By securing a wider area of the ground electrode surrounding the termination resistor than the interval between the termination resistors, dispersion of heat localized in the local portion is promoted and heat dissipation effect is enhanced.

(5) By making the distance between adjacent termination resistors larger than the interval between the termination resistors (the interval along the surface of the termination substrate facing the optical waveguide substrate), local concentration of heat is suppressed.

(6) By setting the impedance of the termination resistor to a value smaller than 50Ω, the heat generation at the termination resistor is suppressed.

Each embodiment will be described in more detail below.

Figure 4A:
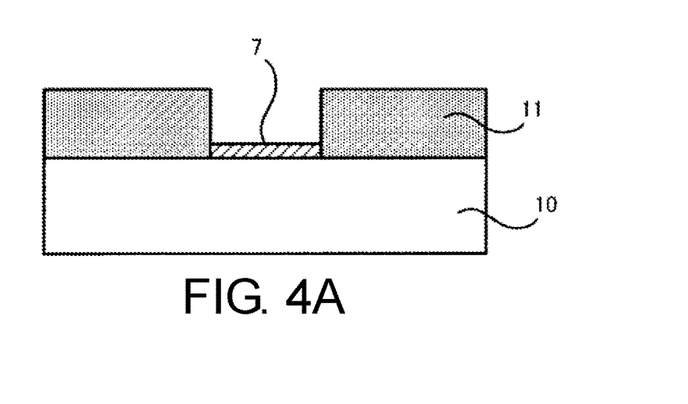
FIG. 4A is a cross-sectional view showing a first embodiment of a termination substrate used in the optical modulator of the present invention.
Figure 4B:
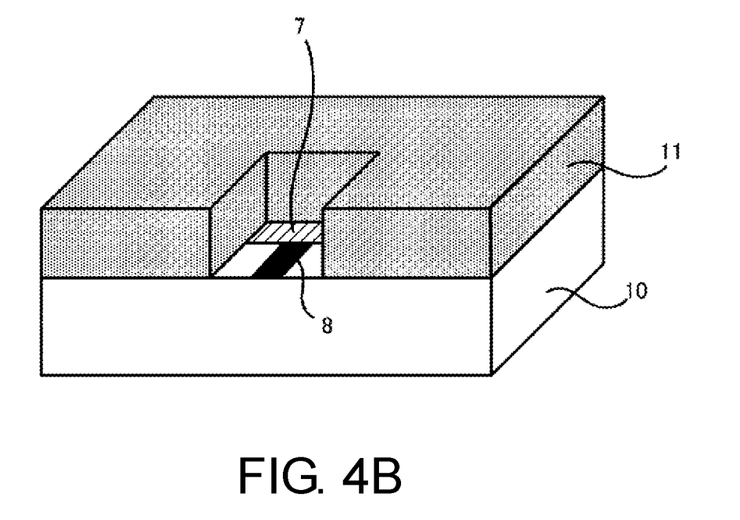
FIG. 4B is a perspective view showing the first embodiment of the termination substrate used in the optical modulator of the present invention.

FIG. 4A and FIG. 4B shows a first embodiment of the optical modulator of the present invention.

A feature of the present invention is to efficiently disperse the heat generated in the termination resistor and to alleviate the localization of heat concentrated in the termination resistor and the vicinity thereof, by thickening the ground electrode 11 connected to the termination resistor 7. In particular, since the heat generated by the termination resistor is localized on the upper surface of the termination substrate, means for radiating heat from the upper surface of the termination substrate is very effective by radiating heat from the bottom surface of the termination substrate.

In the present embodiment, it is possible to solve the problem of heat localized in the termination substrate, by a simple method, with almost no change in the design of the termination resistor of the related art. Specifically, heat problems are effectively solved by efficiently dispersing heat or suppressing concentration of heat.

An electrode film such as a ground electrode in the termination substrate can be manufactured by plating of Au, for example. As the thickness of the electrode film such as the ground electrode becomes thicker, heat generated can be efficiently conducted and dispersed, but from the balance of manufacturing man-hour or cost, it is preferably that the thickness is thicker than 0.1 µm, more preferably, thicker than 0.1 µm and thinner than 20 µm. In addition, due to constraints on the configuration of the optical modulator or the like, in a case where the input electrical signal is large, or where a plurality of termination resistors are formed in the same substrate and the calorific value is large, the thickness of the electrode film may be thicker than 20 µm.

In particular, the invention of the present embodiment has a remarkable effect such as high effect of the first embodiment and easy adaptation, in the optical modulator in which the input signal amplitude is large and a plurality of termination resistors (four in this case) are required as in the DP-QPSK optical modulator.

Although the example in which only the ground electrode 11 is thickened has been shown in the present embodiment, even if the termination resistor 7 or the signal electrode 8 connected to the termination resistor is thickened, a certain effect of heat dispersion can be obtained. Therefore, in conjunction with thickening of the ground electrode connected to the termination resistor, the termination resistor or the like may be thickened. Further, the termination resistor or the like may be separately thickened.

Figure 5:
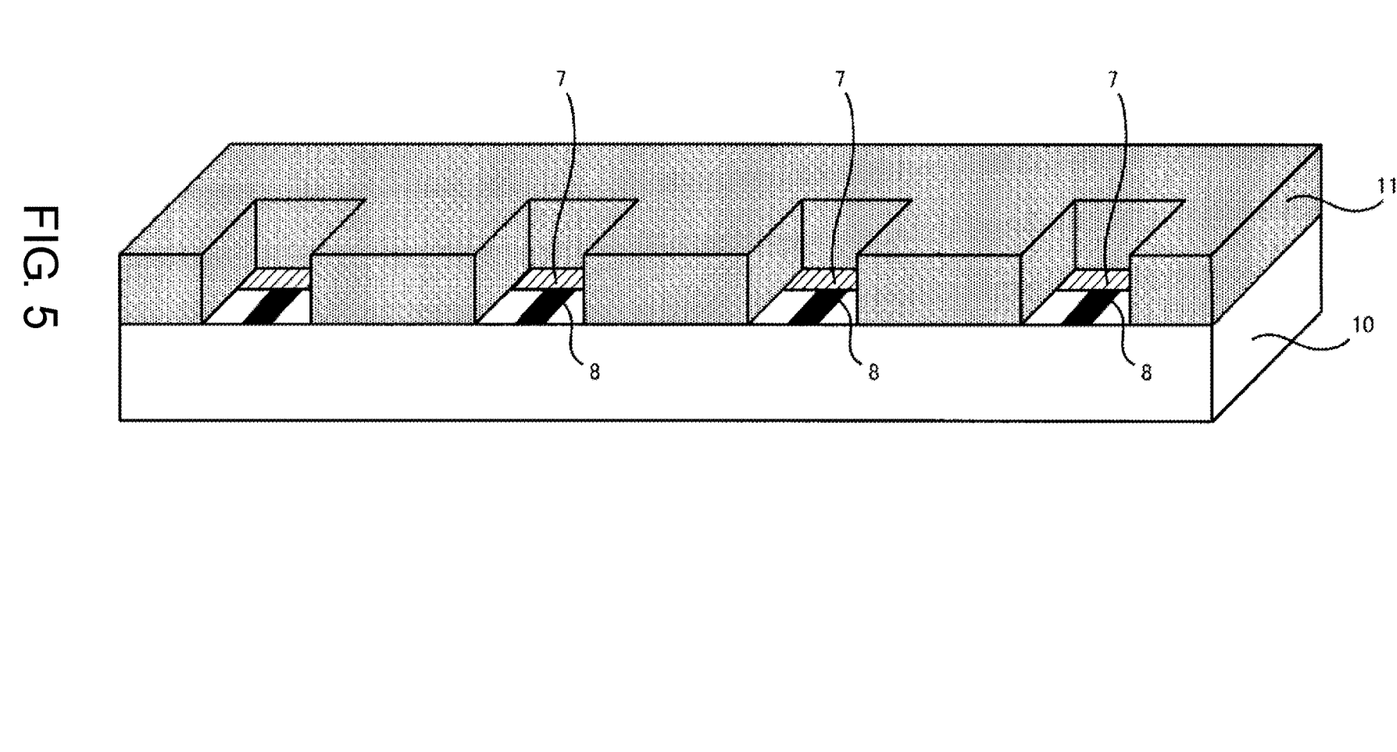
FIG. 5 is a perspective view showing an example in which a plurality of termination resistors of the first embodiment shown in FIG. 4A and FIG. 4B are disposed.

FIG. 5 shows an example of the termination substrate in which a plurality of termination resistors 7 are disposed on the same support 10 with respect to the configuration of the thickened ground electrode 11 shown in FIG. 4A and FIG. 4B. The thickness of the ground electrode 11 may be set uniformly as shown in FIG. 5, or a configuration may be added in which the ground electrode 11 is thick only in the vicinity of the termination resistor 7 and thinner than the ground electrode located in the vicinity, in a place away from the ground electrode located in the vicinity.

Figure 6:
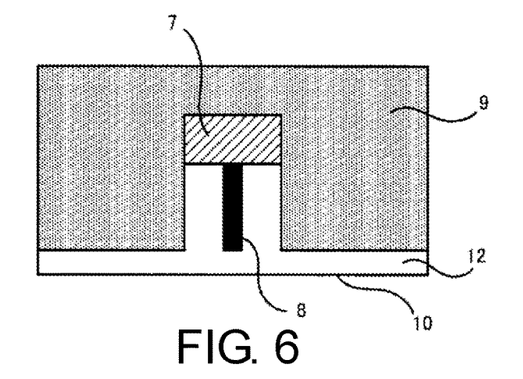
FIG. 6 is a plan view showing a second embodiment of the termination substrate used in the optical modulator of the present invention.

FIG. 6 shows a second embodiment of the optical modulator of the present invention.

The feature of the present invention is that a part of the ground electrode connected to the termination resistor is retracted from the end of the support 10 of the termination substrate. That is, it is to provide a region 12 in which no ground electrode is formed in an area between the end of the support 10 of the termination substrate and the ground electrode 9.

In this embodiment, influence of the heat generated by the termination resistor on the optical waveguide substrate through the ground electrode is suppressed by separating the ground electrode from the optical waveguide substrate. It is preferable that the amount of retraction of the ground electrode is selected from the range of 10 μm to 300 μm so as not to deteriorate the reflection characteristics and the like of the high-frequency signal.

In FIG. 6, the ground electrode 9 is uniformly retracted from the opposing surface of the support 10 of the termination substrate on the optical waveguide substrate side, but the ground electrode 9 is not necessarily required to be retracted uniformly. At least the ground electrode 9 in the vicinity of the termination resistor may be retracted partially, and the amounts of retraction may be different in some parts.

Further, in FIG. 6, the signal electrode 8 connected to the termination resistor is also retracted in synchronization with the ground electrode 9, but the amount of retraction does not need to be set to the same amount, but can be set so as not to retract the signal electrode 8.

Figure 7:
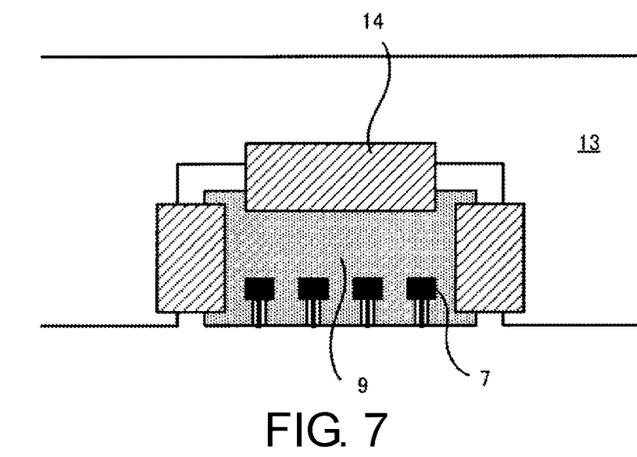
FIG. 7 is a plan view showing a third embodiment relating to housing mounting of the termination substrate used in the optical modulator of the present invention.

FIG. 7 shows a third embodiment of the optical modulator of the present invention.

The present invention is characterized in that heat generated in the termination substrate is effectively released and conducted to the outside of the termination substrate by providing a heat conductive member 14. Specifically, heat is released to the housing 13 on which the termination substrate is mounted.

The heat conductive member can be formed of various metal plates or high heat conductive ceramics or the like, but considering the reliability and the like due to heat expansion and the like, it is preferable to form the heat conductive member with a metal ribbon made of gold or the like, a thin metal plate made of copper, brass, aluminum or the like.

The heat conductive members are connected to the termination substrate (ground electrode) and the housing, with ultrasonic bonding in a case of a metal ribbon, and a heat conductive adhesive or the like in a case of a thin metal plate made of copper, brass, aluminum or the like.

Even in the configuration of the present invention, it is possible to effectively perform a measure against localized heat in the termination substrate by increasing the heat conduction action by the heat conductive member provided on the upper surface of the termination substrate.

Further, as shown in the embodiment of FIG. 7, the present invention is particularly effective for a termination substrate having a plurality of termination resistors 7 formed on the same substrate. In the present embodiment, the termination substrate on which four termination resistors 7 are formed on the same substrate is exemplified, but the number of termination resistors is not limited to four.

Naturally, the configuration of the present invention is effective even when applied to the termination substrate of the related art, but the effect can be further improved by combining with the first or second embodiment.

Figure 8A:
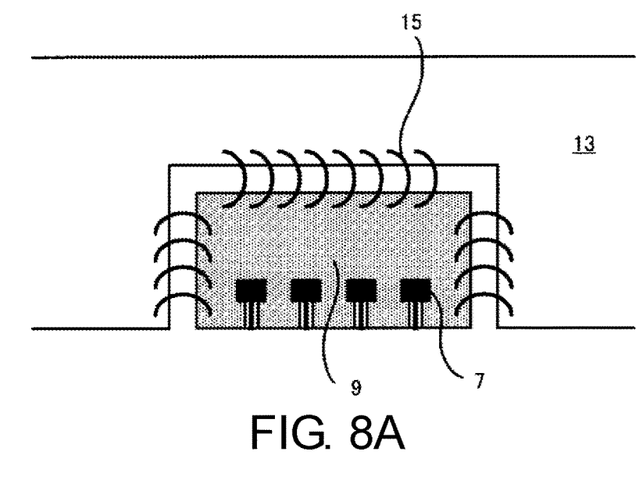
FIG. 8A is a plan view showing an aspect of a fourth embodiment relating to housing mounting of the termination substrate used in the optical modulator of the present invention.
Figure 8B:
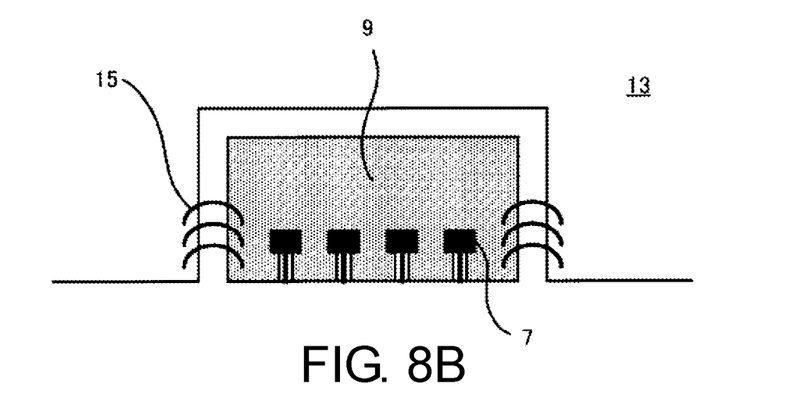
FIG. 8B is a plan view showing another aspect of the fourth embodiment relating to housing mounting of the termination substrate used in the optical modulator of the present invention.

FIG. 8A and FIG. 8B show a fourth embodiment of the optical modulator of the present invention.

In the embodiment of the present invention, a metal wire 15 of gold or the like is used as the heat conductive member shown in the third embodiment of FIG. 7. Considering the productivity related to the manufacture of the optical modulator, the role as a heat conductive member is replaced with a bonding wire.

With this configuration, the productivity of manufacturing the optical modulator can be enhanced, while the efficiency of releasing and conducting heat generated by the termination resistor 7 to the outside of the termination substrate is lower than that of the third embodiment. Therefore, in the case of implementing the present invention, by combining with the first or second embodiment, it is possible to balance manufacturing productivity and heat dissipation and conductivity in a well-balanced manner.

In particular, in the embodiment in which the ground electrode is thickened and the wire bonding is used as the heat conductive member, both high heat dissipation and high productivity can be realized, which is the most preferable embodiment.

In addition, since heat dissipation and heat conductivity can be increased by using thickening together, it is also possible to reduce the number of wire bondings. For example, as shown in FIG. 8B, it is possible to achieve an effective effect only by providing several wire bondings only near the side of the termination resistor that generates heat. In this manner, wire bonding is performed in the vicinity of the termination resistor, which is greatly affected by heat generation, so as to provide the minimum function necessary for heat dissipation, as well as to reduce the number of bondings, which is an effective means for further enhancing productivity.

Incidentally, the above-described wire bonding is different from wire bonding for electrically connecting a high-frequency substrate, such as a high-frequency line including a signal electrode. In order to prevent deterioration of the high-frequency characteristic, the high-frequency electrical connection connects the termination substrate and the substrate such as the optical waveguide substrate and the like in the propagation direction of the high-frequency signal in the vicinity of the signal electrode.

The wire bonding performed in the present invention is provided as heat conductive means, does not need to be provided close to the signal electrode, is provided near the termination resistor rather, and connects the termination substrate and the housing. Thus, it has a different configuration from the wire bonding of high-frequency electrical connection.

Figure 9:
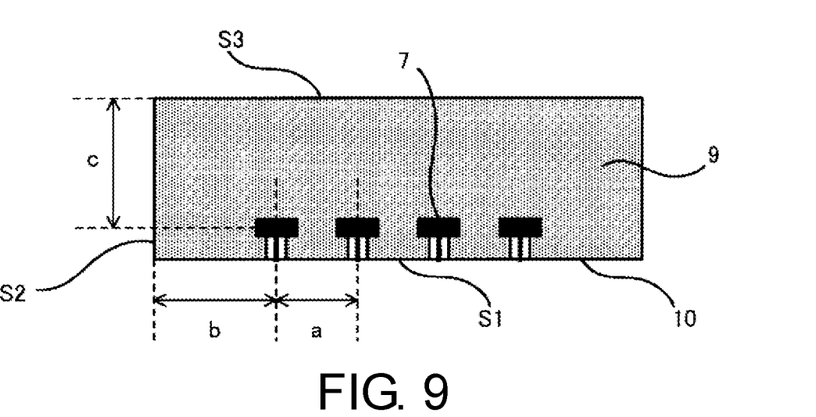
FIG. 9 is a plan view showing a fifth embodiment of the termination substrate used in the optical modulator of the present invention.

FIG. 9 shows a fifth embodiment of the optical modulator of the present invention.

The present embodiment exemplifies an effective designing method in the case where a plurality of termination resistors are formed on the same substrate.

As shown in FIG. 9, the disposition of the termination resistor 7 is set for the interval a between the termination resistors (which is approximately equal to the interval between the output-side electrode pads of the high-frequency signal electrodes formed on the optical waveguide substrates which are generally plural) such that a distance b between a termination resistor R1 located at the extreme end and a lateral surface S2 of the support 10 of the termination substrate close to the termination resistor R1 is larger than the interval a, or a distance c between the termination resistor (7, R1) and a rear surface S3 of the support 10 of the termination substrate is larger than the interval a.

First, since the optical modulator requiring input of plural high-frequency signals such as a DP-QPSK modulator is larger in size and higher in cost than the optical modulator of the related art, the purpose of forming a plurality of termination resistors on the same substrate is based on the intention to further reduce the size and cost of the optical modulator so as to improve at least the above problems. As a result, with respect to design ideas for the termination substrate, it is required to (1) design the termination substrate as small as possible, and (2) design the termination substrate at a low cost as possible.

As a result, the size of the termination substrate to be used is reduced, the yield of the termination substrate with respect to the unit manufacturing batch is increased, and the material cost is reduced. In such a termination substrate, it is usual that the distance b or c from the end of the same termination substrate to the termination resistor is substantially the same or smaller than the interval a between a plurality of termination resistors. In the case where it is intended to reduce the size and cost of the optical modulator, it is easy for a developer having a certain level of the art such as a designer of a high-frequency termination substrate or the like to reach such a design idea.

However, in such a design idea in the related art, there is no idea that heat generated from the termination resistor causes a loss of the reliability of the termination substrate including the termination resistor itself and causes a temperature drift of the optical modulator. Further, there is no awareness of the problem that the heat generation problem described above has a particularly large influence on the optical modulators such as those having large amplitude of the input electrical signal, those having a plurality of termination resistors, and those having termination resistors in the same substrate. Furthermore, by miniaturizing the optical modulators and making them as a plural-element configuration (multi-element configuration), there has been no idea that the effects thereof become more severe.

The embodiment of FIG. 9 provides a technique that can be easily and conveniently realized against such a problem, and is effective and suitable for mass production operation.

The present invention is based on the technical idea of dispersing and conducting localized heat, and reducing the influence of localized heat, by forming a heat conduction area that is wider than the interval at which the termination resistors are formed, regarding heat generated by a plurality of termination resistors.

According to the present invention, it is possible to suppress the occurrence of problems such as deterioration of the reliability of the termination substrate or temperature drift of the optical modulator due to heat generated from a plurality of termination resistors or localized heat thereof, while minimizing the negative impact due to miniaturization and reduction of cost. The present invention is based on a new technical idea and a new idea which are not in the design idea in the related art.

Figure 10:
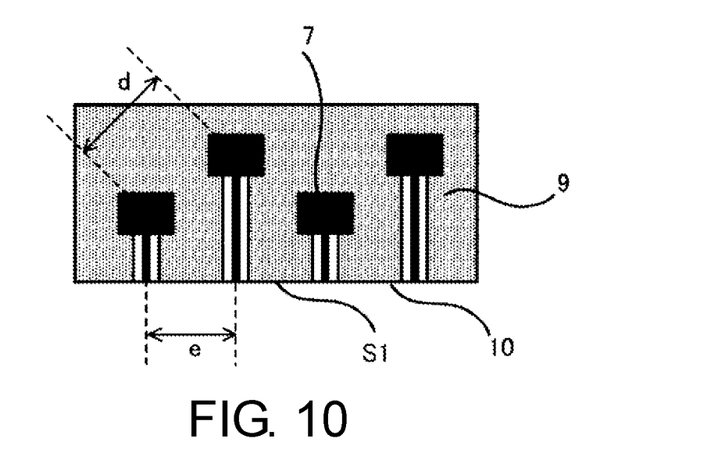
FIG. 10 is a plan view showing a sixth embodiment of the termination substrate used in the optical modulator of the present invention.

FIG. 10 shows a sixth embodiment of the optical modulator of the present invention.

As shown in FIG. 10, the disposition of the termination resistor 7 is set such that the distance d between the adjacent termination resistors is larger than the interval e between the termination resistors in a direction along a front surface S1 of the support 10 of the termination substrate facing the optical waveguide substrate.

By configuring in this way, it is possible to widen the interval between the termination resistors, as compared with the case where termination resistors are disposed in a horizontal row in the related art, and it is possible to alleviate the localization of the heat generated by the termination resistors. In this case as well, as in the fifth embodiment of FIG. 9, the size of the termination substrate is increased, which is out of the design idea of miniaturization and reduction of cost in the related art. However, according to the present invention, it is easy to reduce the influence due to localized heat by dispersing and conducting heat generated by a plurality of termination resistors.

Figure 11A:
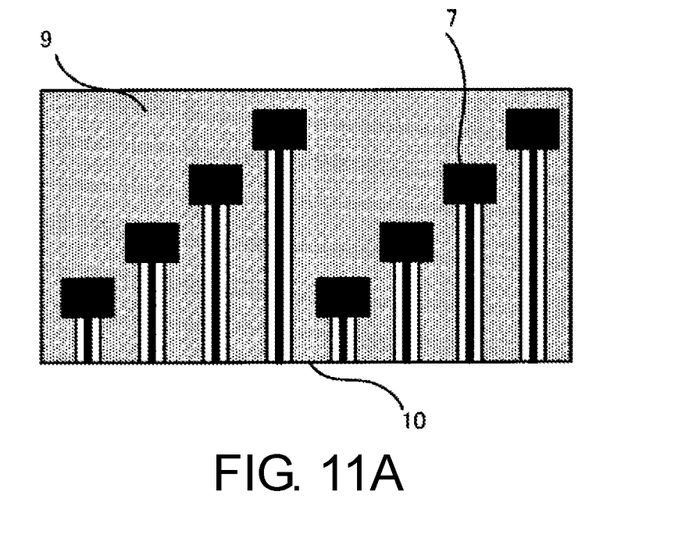
FIG. 11A is a plan view illustrating an aspect of an application example of the sixth embodiment shown in FIG. 10.
Figure 11B:
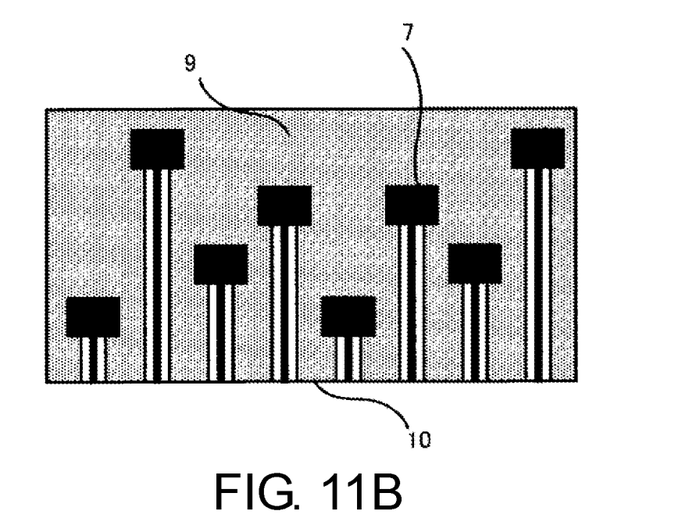
FIG. 11B is a plan view illustrating another aspect of an application example of the sixth embodiment shown in FIG. 10.

Regarding the disposition of the termination resistors, the termination resistors may be disposed with regularity on the substrate as shown in FIG. 11A, or the termination resistors may be disposed at random so as to be dispersed as a whole as shown in FIG. 11B.

If the length of the signal electrode from the high-frequency signal input end to the termination resistor varies as in the case of the embodiment of the termination substrate shown in FIG. 10, FIG. 11A and FIG. 11B, the high-frequency characteristics between respective high-frequency electrodes, for example, high-frequency reflection characteristics (S11 characteristics) are different strictly. Therefore, in the design of the related art, this length is designed to be the same value so as to equalize the characteristics between the respective high-frequency electrodes. However, in the embodiment of the present invention, the intervals are intentionally set to be different.

Specifically, although the difference in length depends on the design of the housing on which the termination substrate is mounted, it is a difference within about several millimeters. The difference in length is remarkably smaller as compared a case where the signal electrode of the optical modulator using ordinary $LiNbO_3$ has a length of about several cm. Further, when increasing the length of the signal electrode in the termination substrate, the S11 characteristics rather moves in a direction to be improved, so even if the configuration of the sixth embodiment is adopted, there is no characteristic problem of the optical modulator.

In the seventh embodiment of the optical modulator of the present invention is to make the resistance value of the termination resistor smaller than 50Ω.

Normally, the resistance value of the termination resistor is set to 50Ω according to the impedance 50Ω of the high-frequency signal source. On the other hand, in order to realize the object of the present invention, it is also possible to set the resistance value of the termination resistor to a value smaller than 50Ω.

By lowering the resistance value of the termination resistor, the calorific value at the termination resistor is further reduced. Therefore, a value smaller than 50Ω can be selected as the value of the termination resistor, within a range to which a required value of the high-frequency characteristic such as S11 characteristic is acceptable. For example, in order to reduce the calorific value at the termination resistor and to make the high-frequency characteristics within an allowable range, it is preferable to select the terminal resistance value from a range of 30Ω to 50Ω. More preferably, it is preferable to select the terminal resistance value from among 40Ω to 50Ω.

In the above description, the configuration of the DP-QPSK modulator using the LiNbO$_3$ substrate has been mainly described. However, as long as it is an optical modulator having a termination resistor and the termination resistor generates heat, the present invention can be applied regardless of the modulation form. Further, the optical waveguide substrate may be made of a semiconductor-based material such as InP or Si. Even in a case where a LiNbO$_3$ substrate is used, it goes without saying that the present invention can be applied regardless of crystal orientation such as Xcut or Zcut.

In the above description, the termination substrate is illustrated in which only the resistor elements as the termination resistors are formed on the same substrate, but capacitors or other electronic components, penetrating conductors, or an electronic circuit including multiple layers may formed in the same termination substrate. In addition, if at least a plurality of termination resistors are provided on the same substrate, it goes without saying that the present invention can be applied to a case where there are a plurality of termination substrates.

INDUSTRIAL APPLICABILITY

As described above, according to the present invention, it is possible to efficiently disperse and release heat generated by termination resistors, and improve the reliability of the termination resistors and the termination substrate including the termination resistors. It is possible to provide a highly reliable optical modulator capable of reducing influence of heat on an optical waveguide, in which temperature drift is suppressed.

The invention claimed is:

1. An optical modulator comprising:
an optical waveguide substrate on which an optical waveguide is formed;
a signal electrode provided on the optical waveguide substrate for applying an electric field to the optical waveguide;
a termination resistor terminating the signal electrode; and
a termination substrate on which the termination resistor is disposed,
wherein at least a plurality of the termination resistors are provided for a single termination substrate, and
wherein for preventing heat generated by the termination resistor from being concentrated on a local portion in the termination substrate or conducted to the optical waveguide substrate,
a ground electrode provided on the termination substrate and electrically connected to the termination resistor, wherein a thickness of the ground electrode is thicker than a thickness of the termination resistor, and the thickness of the ground electrode is formed to be thicker than 0.1 μm, and the ground electrode is physically connected to and surrounding three side surfaces of the termination resistor, and surrounding three side surfaces of the signal electrode, the termination resistor and the ground electrode being disposed on a top surface of the termination substrate, and the three side surfaces of the termination resistor are perpendicular to the top surface of the termination substrate, and wherein three outer sides of the ground electrode are aligned with three edges of the termination substrate, and the ground electrode extends from the three edges of the termination substrate towards an end of the termination substrate on the optical waveguide substrate side to surround the termination resistor and the signal electrode.

2. The optical modulator according to claim 1,
wherein the thickness of the ground electrode is set in a range of 0.1 μm to 20 μm.

3. The optical modulator according to claim 1, wherein a position of an end of the ground electrode on the optical waveguide substrate side in the vicinity of the termination resistor is disposed to be retracted from the end of the termination substrate on the optical waveguide substrate side toward the inside of the termination substrate.

4. The optical modulator according to claim 3,
wherein the position of an end of the ground electrode on the optical waveguide substrate side is disposed to be retracted from the end of the termination substrate on the optical waveguide substrate side toward the inside of the termination substrate in a range of 10 μm to 300 μm.

5. The optical modulator according to claim 1, further comprising:
mounting means for mounting the termination substrate in a housing, wherein the mounting means has a heat conductive member connecting the termination substrate and the housing.

6. The optical modulator according to claim 5,
wherein the heat conductive member is a metal ribbon, a metal thin plate, or a metal wire.

7. The optical modulator according to claim 1, wherein disposition of the termination resistors is set such that for an interval a between the termination resistors, a distance b between a termination resistor R1 located at an extreme end and a lateral surface of the termination substrate close to the termination resistor R1 is larger than the interval a, or a distance c between the termination resistor and a rear surface of the termination substrate is larger than the interval a.

8. The optical modulator according to claim 1, wherein disposition of the termination resistors is set such that a distance d between adjacent termination resistors is larger than an interval e between the termination resistors in a direction along a front surface of the termination substrate facing the optical waveguide substrate.

9. The optical modulator according to claim 1,
wherein a resistance value of the termination resistor is smaller than 50Ω.

10. The optical modulator according to claim 1,
wherein the optical waveguide substrate is made of LiNbO$_3$, InP or Si.

11. The optical modulator according to claim 3,
wherein a resistance value of the termination resistor is smaller than 50Ω.

12. The optical modulator according to claim 5,
wherein a resistance value of the termination resistor is smaller than 50 Ω.

13. The optical modulator according to claim 7,
wherein a resistance value of the termination resistor is smaller than 50 Ω.

14. The optical modulator according to claim 8,
wherein a resistance value of the termination resistor is smaller than 50 Ω.

15. The optical modulator according to claim 3,
wherein the optical waveguide substrate is made of LiNbO$_3$, InP or Si.

16. The optical modulator according to claim 5,
wherein the optical waveguide substrate is made of LiNbO$_3$, InP or Si.

17. The optical modulator according to claim 7,
wherein the optical waveguide substrate is made of LiNbO$_3$, InP or Si.

18. The optical modulator according to claim 8,
wherein the optical waveguide substrate is made of LiNbO$_3$, InP or Si.

19. An optical modulator comprising:
an optical waveguide substrate on which an optical waveguide is formed;
a signal electrode provided on the optical waveguide substrate for applying an electric field to the optical waveguide;
a termination resistor terminating the signal electrode; and
a termination substrate on which the termination resistor is disposed,
wherein at least a plurality of the termination resistors are provided for a single termination substrate, and
wherein for preventing heat generated by the termination resistor from being concentrated on a local portion in the termination substrate or conducted to the optical waveguide substrate,
a ground electrode provided on the termination substrate and electrically connected to the termination resistor, wherein a thickness of the ground electrode is thicker than a thickness of the termination resistor, and the thickness of the ground electrode is formed to be thicker than 0.1 µm, and wherein
the ground electrode is disposed to be retracted from an end of the termination substrate to provide a region in which no ground electrode is formed in an area between the end of the termination substrate and the ground electrode, and wherein the amount of retraction of the ground electrode is selected from a range of 10 µm to 300 µm, and wherein the signal electrode connected to the termination resistor is also retracted in synchronization with the ground electrode.

* * * * *